United States Patent

Reijntjens et al.

(10) Patent No.: US 8,618,220 B2
(45) Date of Patent: Dec. 31, 2013

(54) PROPYLENE COPOLYMER COMPOSITIONS WITH HIGH TRANSPARENCY

(75) Inventors: Ron Reijntjens, Brunssum (NL); Klaas Remerie, Maastricht (NL); Maria Soliman, Schalbruch (DE); Henrica Norberta Alberta Maria Steenbakkers-Menting, Susteren (NL)

(73) Assignee: Saudi Basic Industries Corporation, Riyadh (SA)

( * ) Notice: Subject to any disclaimer, the term of this patent is extended or adjusted under 35 U.S.C. 154(b) by 188 days.

(21) Appl. No.: 11/658,937

(22) PCT Filed: Jun. 17, 2005

(86) PCT No.: PCT/EP2005/006644
§ 371 (c)(1),
(2), (4) Date: Aug. 27, 2008

(87) PCT Pub. No.: WO2006/010414
PCT Pub. Date: Feb. 2, 2006

(65) Prior Publication Data
US 2009/0048399 A1      Feb. 19, 2009

(30) Foreign Application Priority Data

Jul. 30, 2004   (EP) .................................. 04077199

(51) Int. Cl.
*C08L 23/12* (2006.01)
*C08L 23/16* (2006.01)
*C08L 23/04* (2006.01)

(52) U.S. Cl.
USPC ........................................ 525/240; 525/191

(58) Field of Classification Search
USPC ......................................... 525/191, 192, 240
See application file for complete search history.

(56) References Cited

U.S. PATENT DOCUMENTS

| | | | |
|---|---|---|---|
| 4,579,836 A | 4/1986 | Arzoumanidis et al. | |
| 4,612,299 A | 9/1986 | Arzoumanidis et al. | |
| 4,866,022 A | 9/1989 | Arzoumanidis et al. | |
| 4,950,720 A * | 8/1990 | Randall et al. | 525/322 |
| 5,066,737 A | 11/1991 | Job | |
| 5,218,047 A * | 6/1993 | Schwager et al. | 525/88 |
| 5,567,665 A | 10/1996 | Wagner et al. | |
| 6,268,306 B1 | 7/2001 | Zakharov et al. | |
| 6,300,415 B1 | 10/2001 | Okayama et al. | |
| 6,384,142 B1 | 5/2002 | Burkhardt et al. | |
| 2001/0012874 A1* | 8/2001 | Huffer et al. | 525/191 |
| 2003/0195299 A1 | 10/2003 | Stevens et al. | |

FOREIGN PATENT DOCUMENTS

| EP | 1336625 A1 | 8/2003 |
|---|---|---|
| WO | WO 98/45338 | 10/1998 |
| WO | WO 03/051984 A1 | 6/2003 |
| WO | WO/03/106553 | 12/2003 |

OTHER PUBLICATIONS

Maier, C. et al Polypropylene—The Definitive User's Guide and Databook William Andrew Publishing/Plastics Design Library Norwich, NY 1998 pp. 34-35.*
International Search Report; International Application No. PCT/EP2005/006644; International Filing Date Jun. 17, 2005, Date of Mailing Aug. 18, 2005; 2 pages.
Written Opinon of the International Searching Authority; International Application No. PCT/EP2005/006644; International Filing Date: Jun. 17, 2005; Date of Mailing Aug. 18, 2005; 5 pages.

* cited by examiner

*Primary Examiner* — James J Seidleck
*Assistant Examiner* — Jeffrey Lenihan
(74) *Attorney, Agent, or Firm* — Cantor Colburn LLP

(57) ABSTRACT

Propylene copolymer composition comprising a propylene homopolymer (A) as a matrix polymer and a propylene copolymer (B) containing 10-35 wt. % calculated with respect to the amount of B of an olefin other than propylene. The propylene homopolymer and the propylene copolymer are prepared using a Ziegler-Natta catalyst system. The propylene copolymer composition has a transparency higher than 8.

9 Claims, No Drawings

PROPYLENE COPOLYMER COMPOSITIONS WITH HIGH TRANSPARENCY

The invention relates to transparent propylene copolymer compositions comprising a propylene homopolymer (A) as matrix polymer and a propylene copolymer (B) containing 10-35 wt. % of an olefin other than propylene.

Such polymer compositions are known from WO-A-03/106553. The latter document discloses transparent polypropylene compositions of, amongst others, a propylene homopolymer and a propylene copolymer containing 5-40 wt. % of olefins other than propylene. However according to WO-A-03/106553 it is an important feature of the invention that the composition of the propylene copolymer (B) is uniform. Such composition typically is obtained when metallocene catalysts are used, whereas in the conventional propylene copolymers that are polymerized using Ziegler-Natta catalyst systems, blockwise incorporation of the comonomer into the propylene copolymer occurs even at low comonomer concentrations and regardless the of the polymerization process. WO-A-03/106553 therefore teaches away from the use of Ziegler-Natta catalyst systems if a transparent polypropylene copolymer composition is aimed at. Accordingly in all examples of WO-A-03/106553 a metallocene catalyst is used.

Surprisingly applicant found that it is possible to use propylene polymers prepared by Ziegler-Natta catalyst systems in the preparation of polypropylene copolymer compositions that are highly transparent, even if they are based on a propylene homopolymer as the matrix.

The propylene copolymer composition according to the present invention is characterized in that the propylene homopolymer and the propylene copolymer are prepared using a Ziegler-Natta catalyst system and that the propylene copolymer composition has a transparency higher than 8.

The propylene copolymer composition essentially consists of a propylene homopolymer (A) as matrix polymer, a propylene copolymer (B) containing 10-35 wt. % of an olefin other than propylene and, optionally one or more additives.

The propylene homopolymer (A) to be used in the present invention preferably has an isotactic structure, which means that the isotacticity is high, for instance more than 94%, preferably more than 97%. The propylene copolymer (B) to be used in the present invention contains more than 10 wt. %, preferably more than 13 wt. %, and less than 35 wt. %, preferably less than 25 wt. %, for instance 10-35 wt. %, preferably 13-25 wt. %, of an olefin other than polypropylene. Olefins other than propylene that can be used are for instance α-olefins, in particular 1-alkenes having for instance 2 or 4-20 C-atoms, unconjugated dienes having for instance 4-20 C-atoms, or cyclic olefins, optionally containing more than one ring, having a double bond in the ring structure. Although one olefin is preferred, also more than one olefin can be used. Examples of such olefins are ethylene, butene, hexene, styrene, cyclopentene and norbornadiene. Preferably the α-olefin is a 1-alkene having 2 or 4-8 C-atoms; particularly preferred is ethylene.

The total amount of propylene copolymer (B), calculated with respect to the total amount of propylene homopolymer (A) and propylene copolymer (B), is not critical and is for instance between 5 and 50 wt. %, preferably between 10 and 40 wt. %.

The molar mass ($M_w$) and the molecular weight distribution ($M_w/M_n$) of the propylene homopolymer (A) and the propylene copolymer (B) are not particularly critical. The molar mass ($M_w$) of each may for instance vary from 15,000-700,000 g/mol. The molecular weight distribution $M_w/M_n$ of each as a rule will be larger than 3, in particular larger than 3.5.

The ratio of the melt flow rate of the propylene homopolymer (A) to the melt flow rate of the propylene copolymer (B) ($MFR_A/MFR_B$) preferably is lower than 50, more preferably lower than 20, most preferably lower than 10.

The propylene copolymer compositions according to the invention show superior properties, particularly as regards transparency. The propylene copolymer compositions according to the invention can suitably be used for instance in compression molding, blow molding, injection molding or extrusion of moldings, films, sheets or pipes to be applied in a wide range of uses, for instance, thin wall packaging, caps and closures, pails and containers, crates and boxes, cans and bottles, houseware, toys, multi-media packaging and electrical applications.

Transparancy as used in here is defined as transmission minus Haze. The determination of the haze and transmission values was carried out in accordance with the standard ASTM D1003 using as test specimens injection moulded plates having an edge length of 65*65 mm and a thickness of 1.6 mm, as described in the examples. The transparency is higher than 8, preferably higher than 10, more preferably higher than 15, particularly higher than 25, more particularly higher than 35.

With the polypropylene copolymer compositions according to the invention it is possible to combine a high transparency with a high Flexural Modulus. It appeared possible to obtain a Flexural Modulus, measured in accordance with ASTM D790 using a test specimen that was injection moulded and prepared to a length of 63.5 mm, a width of 12.7 mm and a thickness of 3.2 mm, that was higher than 600 MPa, particularly higher than 800 MPa, more particularly higher than 950 MPa, most particularly higher than 1100 MPa.

It appeared possible to reach a high transparency and/or high Flexural Modulus not only in applications requiring a low MFR, but also, surprisingly, in applications requiring a high MFR, for instance a MFR higher than 4, particularly higher than 10, more particularly higher than 20, even more particularly higher than 30. The Melt Flow Rate (MFR) is measured in accordance with ISO 1133 using a 2.16 kg weight and at a temperature of 230° C. (as described in the examples).

In addition the propylene copolymer compositions according to the invention as a rule show a good blushing behaviour. The blushing behaviour, also known as stress whitening behaviour, measured in accordance with the dome method DIN 53445 and determined according to the ranking as described in the examples, using a dart having a mass of 500 g (as described in the examples) preferably is lower than 8, more preferably lower than 6, most preferably lower than 4.

In addition it appeared possible to reach a high impact. The impact (notched Izod) was measured in accordance with ISO 180/4A as described in the examples. The Izod notched impact (0° C., perpendicular) preferably is higher than 2.0 $KJ/m^2$, more preferably higher than 3.0 $KJ/m^2$, most preferably higher than 5.0 $KJ/m^2$. The Izod notched impact (23° C., perpendicular) preferably is higher than 3.5 $KJ/m^2$, more preferably higher than 5.0 $KJ/m^2$, most preferably higher than 9.0 $KJ/m^2$.

With the propylene copolymer compositions according to the invention a high transparency can be obtained with still a high stiffness/impact balance, even at high MFR, for instance a transparancy higher than 25 and/or Flexural Modulus higher than 950 MPa and/or a MFR higher than 25 and/or a blushing lower than 6 and/or an Izod notched impact (0° C., perpendicular) higher than 3.0 KJ/m² and/or an Izod notched impact (23° C., perpendicular) higher than 5.0 KJ/m².

The propylene copolymer composition according to the invention may contain additives, for instance nucleating agents and clarifiers, stabilizers, release agents, fillers, peroxides, plasticizers, anti-oxidants, lubricants, antistatics, cross linking agents, scratch resistance agents, high performance fillers, pigments and/or colorants, impact modifiers, flame retardants, blowing agents, acid scavengers, recycling additives, coupling agents, anti microbials, anti fogging additives, slip additives, anti blocking additives, polymer processing aids and the like. Such additives are well known in the art. The skilled person will choose the type and amount of additives such that they do not detrimentally influence the aimed properties of the composition.

The propylene copolymer composition according to the invention preferably contains a nucleating agent or clarifying agent, for instance an inorganic nucleating agent e.g. silica, talc, a salt of a carboxylic acid having one or more carboxyl groups, for instance benzoates, in particular sodium benzoate (for instance MI.NA.08; Adeka Palmarole) or Li-benzoate (for instance MI.NA.20 Adeka Palmarole), a salt of a diester of phosphoric acid, for instance 2,2' methylene-bis(4,6-di-tert.-butylphenyl) sodium phosphate (for instance ADK STAB NA-11; Adeka Palmarole), or a clarifying agent, for instance a dibenzilidene sorbitol, for instance dibenzylidenesorbitol whether or not substituted with one or more, specifically 1-3, alkyl groups having for instance 1-10 C-atoms, in particular, 1,3:2,4-bis(p-methylbenzilidene) sorbitol (MDBS) (for instance Millad 3940; Milliken), 1,3:2,4-bis(3, 4-dimethylbenzilidene) sorbitol (for instance Millad 3988; Milliken) or 1,3:2,4-bis(p-ethylbenzylidene)-sorbitol (for instance NC-4; Mitsui).

In the polymerizations use is made of so-called Ziegler-Natta catalyst systems. Ziegler-Natta catalyst systems (also sometimes referred to as Ziegler catalysts) are well known and for those skilled in the art, it is immediately obvious that the term Ziegler-Natta catalysts refers to different types of catalyst compared to for instance metallocene catalysts.

Ziegler-Natta catalyst systems in different forms have been in commercial use for more then 4 decades, whereas metallocenes have found limited commercial application in the production of polypropylene for about 1 decade only. This difference has led to the term "conventional catalysis" in order to distinguish Ziegler-Natta catalysis from metallocene catalysis.

The term Ziegler-Natta catalyst systems refers to so-called heterogeneous catalyst systems, contrary to the metallocene catalysts, which refer to so-called homogeneous catalyst systems.

By way of illustration and by no means intended to limit the scope of the present invention, some of the typical differences between metallocenes and Ziegler-Natta catalyst systems are described below, with the emphasis on the different merits of these catalyst systems for the production of isotactic polypropylene and copolymers of different olefins, like for example copolymers of ethylene and propylene.

It is noted here that although the term metallocene catalysts originally referred to a specific class of cyclopentadienyl containing organometallic compounds, several kinds of homogeneous catalysts for olefin polymerizations lacking such a cyclopentadienyl ligand have been described more recently that behave similar to the metallocenes. Hence the term metallocenes as used here is meant to include all other kinds of homogeneous single site catalysts for olefin polymerization.

A striking difference between Ziegler-Natta catalyst systems and metallocene catalysts can be found in their resulting polymers.

As is well known in the art, the term metallocene catalyst systems refers to catalysts that behave as single site catalysts, i.e. all the active species in the catalyst produce polymers of similar molecular weight, stereoregularity (or "tacticity"), regioregularity (or "amount of regiomistakes") and comonomer distribution. Ziegler-Natta catalyst systems contain several different kinds of active species that produce polymers with largely different molecular weights, stereoregularity, regioregularity and comonomer distribution. As a result of this, metallocenes result in polymers with narrow molecular weight distribution (i.e. $M_w/M_n$ typically is below 3) and a homogeneous comonomer distribution, whereas Ziegler-Natta catalyst systems produce polymers with rather broad molecular weight distribution (i.e. MWD>3) and broad comonomer distribution.

An additional difference between Ziegler-Natta catalyst systems and metallocene catalysts is the requirements for the type of cocatalyst or "activator". For those skilled in the art, it is known that metallocenes have to be activated by cation generating compounds or cocatalysts like for example MethylAluminoxane (MAO) and/or Borates and/or Boranes. These cocatalysts serve to abstract a substituent from the metallocene in order to transform the neutral metallocene in an active cationic form.

On the other hand, Ziegler-Natta catalysts do not require cation generating activators, but they can be activated by rather simple organometallic compounds, which in general are main-group organometallic compounds, like for example triethylaluminum or diethylaluminumchloride.

An additional distinguishing feature between Ziegler-Natta catalyst systems and metallocenes is the transition metal compound. The most well known metallocenes for isotactic polypropylene are based on Titanium, Zirconium or Hafnium in their tetravalent form containing so-called π-ligands based on cyclopentadienyl skeletons.

Recently several new classes of single site catalysts have been developed that can behave similar to the metallocenes, despite the lack of ligands based on a cyclopentadienyl skeleton. A popular term for these non-cyclopentadienyl systems is "post-metallocenes".

The industrially most relevant Ziegler-Natta catalyst systems for isotactic polypropylene are based on Titanium compounds, and it is generally believed that the active titanium in these catalysts is in a neutral trivalent form. The titanium compounds in Ziegler-Natta catalyst systems do not contain π-ligands but so-called σ-ligands, like halides or alkoxides.

Typically, Ziegler-Natta catalyst systems for isotactic polypropylene are heterogeneous by nature, either as a solid, crystalline transition metal compound, like $TiCl_3$, or as transition metal compound supported on $MgCl_2$ and/or an inorganic oxide. It is generally accepted that the surface of the support material or the surface of the solid catalyst plays a crucial role in the ability to produce isotactic polypropylene with Ziegler-Natta catalyst systems. Additionally, the support material in Ziegler-Natta catalyst systems has the role to control the morphology of the resulting polymer powder.

Ziegler-Natta catalyst systems are well known in the art. The term normally refers to catalyst systems comprising a transition metal containing solid catalyst compound (a) and an organo-metal compound (b). Optionally one or more electron donor compounds (external donor) (c) may be added to the catalyst system as well.

The transition metal in the transition metal containing solid catalyst compound is normally chosen from groups 4-6 of the Periodic Table of the Elements (Newest IUPAC notation); more preferably, the transition metal is chosen from group 4; the greatest preference is given to titanium (Ti) as transition metal.

Although various transition metals are applicable, the following is focused on the most preferred one being titanium. It is, however, equally applicable to the situation where other transition metals than Ti are used. Titanium containing compounds useful in the present invention as transition metal compound generally are supported on hydrocarbon-insoluble, magnesium and/or an inorganic oxide, for instance silicon oxide or aluminum oxide, containing supports, generally in combination with an internal electron donor compound. The transition metal containing solid catalyst compounds may be formed for instance by reacting a titanium (IV) halide, an organic internal electron donor compound and a magnesium and/or silicon containing support. The transition metal containing solid catalyst compounds may be further treated or modified with an additional electron donor or Lewis acid species and/or may be subjected to one or more washing procedures, as is well known in the art.

Suitable magnesium-containing supports include magnesium halides; a reaction product of a magnesium halide such as magnesium chloride or magnesium bromide with an organic compound, such as an alcohol or an organic acid ester, or with an organometallic compound of metals of groups 1-3; magnesium alcoholates; or magnesium alkyls.

One possible magnesium-containing support, described in U.S. Pat. No. 4,612,299, (incorporated by reference herein) is based on at least one magnesium carboxylate prepared in a reaction between a hydrocarbyl magnesium (halide) compound with carbon dioxide.

A second possible magnesium-containing support is described in U.S. Pat. No. 6,268,306. The compound described is obtained by reaction of metallic magnesium with an aromatic halide of which one reaction product is separated from the solid residual products and reacted with a silane compound containing an alkoxy or arylalkoxy group to a precipate a second reaction product. Optionally this second reaction product is then contacted with for instance a halogenized titanium compound to form a transition metal containing solid catalyst compound.

Again another possible magnesium containing support is described in WO-A-98/45338. One solid catalyst component is synthesized through the reaction of anhydrous magnesium chloride with the mono ether epoxy-chloropropane and tributyl phosphate. The reaction mixture is reacted with phthalic anhydride at elevated temperature. Subsequently this magnesium containing support can optionally be reacted with titanium tetrachloride at low temperatures to yield a polymerization catalyst.

Another example is given in U.S. Pat. No. 5,567,665. Herein the synthesis of a magnesium-containing support is cited by reacting a mixture of magnesium ethoxide with ethanol with carbon dioxide. The reaction product, a carboxylated magnesium ethoxide is then spray dried on silica and decarboxylated in the next reaction step by evaporation of carbon dioxide.

In U.S. Pat. No. 5,066,737 another possible magnesium-containing support is cited. The magnesium-containing support is prepared by reacting magnesium ethoxide with titanium ethoxide and o-cresol in chlorobenzene. Subsequently the resulting reaction mixture is mixed with a magnesium-ethanol adduct and chlorobenzene to form the solid magnesium-containing support.

In EP 1336625 A1 a catalyst component comprising a titanium containing compound, a magnesium compound and an inorganic support is cited. The catalyst component is prepared by reacting a silicagel with an organomagnesium compound and subsequent treatment with hydrogen chloride. In a next stage the obtained solid is treated with a titanium compound and optionally an internal donor to yield a transition metal containing solid catalyst compound.

The transition metal containing solid catalyst compounds described above only are illustrative of many possible transition metal containing solid catalyst compounds that can be used in the process of the present invention. The invention is not limited to such examples.

Titanium (IV) containing compounds useful in preparing the transition metal containing solid catalyst compound preferably are titanium halides and haloalcoholates having 1 to about 20 carbon atoms per alcoholate group. Mixtures of titanium containing compounds can be employed if desired. Preferred titanium containing compounds are the halides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$ and $Ti(OC_8H_{17})_3Cl$. Titanium tetrahalides, particularly titanium tetrachloride ($TiCl_4$), are most preferred.

Internal electron donors useful in the preparation of a stereospecific transition metal containing solid catalyst compound can be organic compounds containing one or more atoms of oxygen, nitrogen, sulphur and phosphorus. Such compounds include mono- and polyfunctional organic acids, organic acid esters, alcohols, ethers, aldehydes, ketones, amines, amine oxides, amides, thiols and various phosphorous acid esters and amides, and the like. Mixtures of internal electron donors can be used if desired. Specific examples of useful oxygen-containing internal electron donors include organic acids and esters. Examples of such organic acids are organic acids containing from 1 to about 20 carbon atoms and 1 to about 4 carboxyl groups.

Preferred internal electron donors include esters of aromatic acids, particularly $C_1$-$C_6$ alkyl esters of aromatic mono- and dicarboxylic acids, and $C_1$-$C_6$ alkyl esters of halogen, hydroxyl-, oxo-, alkyl-, alkoxy-, aryl-, and aryloxy-substituted aromatic mono- and dicarboxylic acids. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are preferred. Other preferred esters include ethyl p-anisate and methyl-p-toluate. An especially preferred aromatic ester is a dialkylphthalate ester in which the alkyl group contains from about two to about ten carbon atoms. Examples of preferred phthalate esters are diisobutylphthalate, ethylbutylphthalate, diethylphthalate, di-n-butylphthalate, bis(2-ethylhexyl)phthalate, and diisodecylphthalate.

Further examples of preferred internal electron donor compounds include derivatives of the class of succinates, malonates and 1,3-propanediethers as well known by those skilled in the art.

The internal electron donor may for instance be used in an amount ranging from about 0.001 to about 1.0 mol per gram atom of the transition metal and preferably from about 0.005 to about 0.8 mol. Best results are achieved when this ratio ranges from about 0.01 to about 0.6 mol per gram atom of the transition metal.

Although not required, the transition metal containing solid catalyst compound may be contacted with at least one Lewis acid prior to polymerization. Such Lewis acids are generally liquids at treatment temperatures and have a Lewis acidity high enough to remove impurities such as un-reacted starting materials and poorly affixed compounds from the surface of the above-described solid reaction product. Preferred Lewis acids include halides of group 4, 5, 13-15 metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferred Lewis acids are $TiCl_4$ and $SiCl_4$. Mixtures of Lewis acids can be employed if desired. Such Lewis acid may be used in a compatible diluent.

In the case the transition metal containing solid catalyst compound comprises a transition metal supported on a magnesium containing support, it preferably contains from about 1 to about 6 wt. % transition metal, from about 10 to about 25 wt. % magnesium, and from about 45 to about 65 wt. % halogen, more preferably from about 1.0 to about 5 wt. % transition metal, from about 15 to about 21 wt. % magnesium, and from about 55 to about 65 wt. % chlorine.

In the case the transition metal containing solid catalyst compound comprises a transition metal, a magnesium compound and an inorganic oxide as support, it preferably contains from 1 to about 6 wt. % transition metal, from about 2 to about 20 wt. % magnesium and 20 to about 60 wt. % chlorine.

In the catalyst system for instance an organo-metal hydride and/or a metal alkyl compound is used as a co-catalyst. The metal in this compound is chosen from groups 1-3 and 12-13 of the Periodic Table of Elements. Preferred is a metal alkyl and, more preferred, an alkyl aluminum compound.

Preferred metal alkyls are, for instance, compounds of the formula $MR_m$ wherein M is chosen from groups 2, 12 or 13, each R is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, R, include methyl, ethyl, butyl, isobutyl, hexyl, octyl, decyl, tetradecyl, and eicosyl.

From the standpoint of polymerization performance, preferred metal alkyls are those of magnesium, zinc, and aluminum wherein the alkyl radicals each may contain, for instance, 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Mg(C_4H_9)(C_8H_{17})$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_{12}H_{25})_2$, $Al(CH_3)_3$, $Al(C_2H_5)_3$, $Al(C_3H_7)_3$, $Al(C_4H_9)_3$, $Al(C_6H_{13})_3$, and $Al(C_{12}H_{25})_3$. More preferably a magnesium, zinc, or aluminum alkyl containing 1 to about 6 carbon atoms per alkyl radical is used. Alkyl aluminum compounds are most preferred. Best results are achieved through the use of trialkylaluminums containing 1 to about 6 carbon atoms per alkyl radical, and particularly triethylaluminum and triisobutylaluminum or a combination thereof.

If desired, metal alkyls having one or more halogen or hydride groups can be employed, such as ethylaluminum dichloride, diethylaluminum chloride, ethylaluminum sesquichloride or diisobutylaluminum hydride.

In a catalyst system used in the polymerization process, typically, the organo-metal compound to transition metal atomic ratios are, for instance, about 10 to about 500 and preferably about 30 to about 300.

The transition metal containing solid catalyst compound used in this invention may be pre-polymerized with an α-olefin before use as a polymerization catalyst. In one embodiment of the pre-polymerization the transition metal compound and an organo-metal compound as a co-catalyst (for instance triethylaluminum) are contacted with an α-olefin (for instance propylene), preferably in the presence of an external electron donor (for instance a silane and preferably an organosilane). The pre-polymerization can be carried out in an inert hydrocarbon (for instance hexane), in liquid or in the gas phase. Typically, the polymer/catalyst weight ratio of the resulting pre-polymerized component is about 0.1:1 to about 20:1. Pre-polymerization forms a coat of polymer around the catalyst particles, which in many instances improves the particle morphology, activity, stereospecificity, and attrition resistance. A particularly useful pre-polymerization procedure is described in U.S. Pat. No. 4,579,836.

Optionally an external electron donor is present in the catalyst system, meaning that this compound is added to the reaction system, and not used in the preparation of the transition metal containing solid catalyst compound (vide a) supra). External electron donor compounds used in the process of the present invention can be organic compounds containing one or more atoms of oxygen, nitrogen, sulphur and phosphorus. Such compounds include mono- and polyfunctional organic acids, organic acid esters, alcohols, ethers, aldehydes, ketones, amines, amine oxides, amides, thiols and various phosphorous acid esters and amides, and the like. Mixtures of external electron donors can be used if desired. The external electron donor, if any, and the internal electron donor compound used in the preparation of the transition metal containing solid catalyst component may be the same or different. Preferred external electron donor compounds are organosilane compounds of general formula: $R^1_q Si(OR^2)_{4-q}$ (in which each $R^1$ independently may represent a $C_{1-20}$-alkyl, cycloalkyl, phenyl, vinyl, allyl, or aryl group optionally containing heteroatoms; each $R^2$ independently may represent a $C_{1-4}$-alkyl, cycloalkyl, phenyl, vinyl, allyl, or aryl group optionally containing one or more, preferably 1-3, heteroatoms, for instance O, S and P; and q represents 0 or an integer of from 1 to 3). Examples of such organosilane compounds are alkylalkoxysilanes, arylalkoxysilanes, aryl(cyclo)alkylalkoxysilanes, (cyclo)alkylalkoxysilanes, or mixtures thereof, for instance diisopropyldimethoxysilane, diisobutyldimethoxysilane, isobutylisopropyldimethoxysilane, dicyclohexyldimethoxysilane, diphenyldimethoxysilane, phenylmethyldiethoxysilane, cyclohexylmethyldimethoxysilane, ethyltriethoxysilane, dicyclopentyldimethoxysilane, propyltrimethoxysilane, phenyltrimethoxysilane.

The external donor, if added at all, is usually added to the other catalyst system components or added separately to the polymerization reactor, preferably in a molar ratio relative to the transition metal of from 0.1:1 to 250:1.

Crystalline poly-α-olefins can be prepared by contacting at least one α-olefin with a Ziegler Natta catalyst system under polymerization conditions. Such conditions include polymerization temperature and time, monomer pressure, avoidance of contamination of catalyst, choice of polymerization medium in slurry processes, the use of ingredients (like hydrogen) to control polymer molecular weights, and other conditions well known to persons of skill in the art. Slurry-, bulk-, and gas-phase polymerization processes or combinations of the latter in a multistage process are contemplated herein.

The amount of catalyst to be employed varies depending on the choice of polymerization technique, reactor size, monomer to be polymerized, and other factors known to persons skilled in the art. Typically, catalysts are used in amounts ranging from about 0.2 to 0.02 milligrams of catalyst to gram of polymer produced.

Irrespective of the polymerization process employed, polymerization preferably will be carried out at temperatures sufficiently high to ensure reasonable polymerization rates and avoid unduly long reactor residence times, but not so high as to result in the production of unreasonably high levels of stereorandom products with problems of stickiness and bad morphology. Generally, temperatures range from about 40° C. to about 150° C. with about 60° C. to about 100° C. being preferred from the standpoint of attaining good catalyst performance and high production rates.

The polymerization preferably is carried out at monomer pressures of about atmospheric or above. Generally, monomer pressures range from about 0.1 to 5 MPa although in gas phase polymerizations, monomer pressures should not be below the vapor pressure at the polymerization temperature of the α-olefin(s) to be polymerized.

The polymerization time will generally range from about ½ to several hours in batch processes with corresponding average residence times in continuous processes. Polymerization times ranging from about 1 to about 4 hours are typical in autoclave-type reactions. In slurry processes, the polymerization time can be regulated as desired. Polymerization times ranging from about ½ to several hours are generally sufficient in continuous slurry processes and gas phase processes.

Diluents suitable for use in slurry polymerization processes include alkanes and cycloalkanes (such as pentane, hexane, heptane, n-octane, isooctane, cyclohexane, and methylcyclohexane); alkylaromatics (such as toluene, xylene, ethylbenzene; isopropylbenzene, ethyl toluene, n-propyl-benzene, diethylbenzenes, and mono- and dialkyl-naphthalenes); halogenated and hydrogenated aromatics (such as chlorobenzene, chloronaphthalene, orthodichlorobenzene, tetrahydronaphthalene, decahydronaphthalene); high molecular weight liquid paraffins or mixtures thereof, and other well-known diluents. It often is desirable to purify the polymerization medium prior to use, for instance by distillation, percolation through molecular sieves, contacting with a compound such as an alkylaluminum compound capable of removing trace impurities, or by other suitable means.

Examples of gas-phase polymerization processes include both stirred bed reactors and fluidized bed reactor systems; such processes are well known in the art. Typical gas phase α-olefin polymerization reactor systems comprise a reactor vessel to which α-olefin monomer(s) and a catalyst system can be added and which contain an agitated bed of forming polymer particles. Typically, the components of the catalyst system are added together or separately through one or more valve-controlled ports in the reactor vessel. α-Olefin monomer, typically, is provided to the reactor through a recycle gas system in which un-reacted monomer removed as off-gas and fresh feed monomer are mixed and injected into the reactor vessel. A quench liquid which can be liquid monomer, can be added to the polymerizing α-olefin through the recycle gas system in order to control temperature.

It is well known that α-olefin polymers can be exothermically produced as powders in fluidized bed reactors wherein the fluidization is provided by a circulating mixture of gases that includes the monomer(s). The fluidizing gases leaving the reactor can be re-circulated with cooling before reintroduction to the reactor in order to remove the heat of reaction and keep the fluidized bed temperature at the desired temperature. Preferably (a portion of) the re-circulating stream (the off gas) is cooled to condense a portion of said gas to liquid, after which the condensed and cooled products are (at least partially) recycled to the reactor. It is advantageous to remove the latent heat of vaporization, in addition to the sensible heat accumulated in the gas, since the latent heat of vaporization is much larger per degree of cooling than the sensible heat of the uncondensed stream.

Irrespective of polymerization technique, polymerization is carried out under conditions that exclude oxygen, water, and other materials that act as catalyst poisons.

Although not usually required, upon completion of polymerization, or when it is desired to terminate polymerization or deactivate the catalyst system in the process of the present invention, the polymer can be contacted with water, alcohols, oxygen, acetone, or other suitable catalyst deactivators in a manner known to persons skilled in the art.

Polymer yields are sufficiently high relative to the amount of catalyst employed so that useful products can be obtained without removal of catalyst residues. Further, levels of stereorandom by-products are sufficiently low so that useful products can be obtained without removal thereof. The polymeric products can be fabricated into useful articles by extrusion, injection molding, and other common techniques.

The invention will be elucidated by the following examples without being restricted thereby.

EXAMPLES

Gas-Phase Polymerization

Gas-phase polymerizations were performed in a set of two horizontal, cylindrical reactors in series, wherein a homopolymer was formed in the first reactor and optionally a typical ethylene—propylene copolymer rubber in the second one to prepare an impact copolymer. The first reactor was operated in a continuous way, the second one in a batch manner. In the synthesis of the homopolymer, the polymer was charged into the secondary reactor blanketed with nitrogen. The first reactor was equipped with an off-gas port for recycling reactor gas through a condenser and back through a recycle line to the nozzles in the reactor. Both reactors had a volume of one gallon (3.8-liter) measuring 10 cm in diameter and 30 cm in length. In the first reactor liquid propylene was used as the quench liquid; for the synthesis of copolymers the temperature in the second reactor was kept constant by a cooling jacket. A high activity catalyst produced in accordance with U.S. Pat. No. 4,866,022 was introduced into the first reactor as a 5-7 wt. % slurry in hexane through a liquid propylene-flushed catalyst addition nozzle. Diisopropyl-methoxysilane and TEAl in hexane at an Al/Mg ratio of 4 and Al/Si ratio of 6 were fed to the first reactor through a different liquid propylene flushed addition nozzle. During operation, polypropylene powder produced in the first reactor passed over a weir and was discharged through a powder discharge system into the second reactor. The polymer bed in each reactor was agitated by paddles attached to a longitudinal shaft within the reactor that was rotated at about 50 rpm in the first and at about 75 rpm in the second reactor. The reactor temperature and pressure were maintained at 71° C. and 2.2 MPa in the first and for the copolymer synthesis at 66° C. and 2.2 MPa in the second reactor. The production rate was about 200-250 g/h in the first reactor in order to obtain a stable process. By varying the amount of hydrogen in the first reactor, homopolymers with different melt flow rates were obtained. For the copolymer synthesis, hydrogen was fed independently to both reactors to control a melt flow rate ratio over the homopolymer powder and copolymer powder. The composition of the ethylene-propylene copolymer ($RCC_2$) was controlled by adjusting the ratio ethylene and propylene ($C_2^=/C_3^=$) in the recycling gas in the second reactor based on gas chromatography analysis. In this respect, $RCC_2$ is the amount of ethylene incorporated in the rubber fraction (wt.

%) and RC is the amount of rubber incorporated in the impact copolymer (wt. %) determined by $^{13}$C-NMR spectroscopy.

Four polymers 1, 2, 3 and IV (comparative) were produced under the conditions as described in Table 1.

Compounding

The polymer powder obtained in the polymerization and indicated as 1, 2, 3 and IV in table 1 was mixed with a standard additive mixture in the granulation step. Granulation was carried out under $N_2$ using a PM20, a single screw extruder from Plast Machine Bau GMBH at a barrel temperature of 240° C. The propylene copolymer composition obtained contained 0.05% by weight of Irganox 1010 (from CIBA), 0.05% by weight of Irgafos 168 (from CIBA) and either 0.05% by weight of calcium stearate in combination with 0.20 by weight of Millad 3988 (bis-3,4-dimethylbenzylidenesorbitol from Milliken Chemical) or 0.025% by wt DHT4A (Mitsui) in combination with 0.05% by wt ADK STAB NA-11 (from Adeka Palmarole). Of several samples indicated by * rheology was controlled with a dialkylperoxide (Luperco 802PP40).

Injection Moulding

Sample pallets were injection moulded into test specimens using a 45-ton Arburg (diameter 22 mm) injection-moulding machine. The temperature of the cylinder is 240° C., the temperature of the mould is 50° C. For Haze, transparent and stress whitening measurements 1.6 mm thick test plaques were molded. For mechanical measurements 3.2 mm thick test plaques were molded.

Analyses

Transparency

Transparency is defined as Transmission minus Haze. The determination of the Haze and Transmission values was carried out in accordance with the standard ASTM D1003. The test specimens were injection moulded plates having an edge length of 65*65 mm and a thickness of 1.6 mm. After a storage time of 14 days at room temperature for after-crystallization, the test specimens were clamped into the clamping device in front of the inlet orifice of a Hazegard System XL211 from Pacific Scientific and the measurement was subsequently carried out. Testing was carried out at 23° C., with each test specimen being examined once in the middle. To obtain the test value, 5 test specimens were tested in each case.

Blushing Behaviour.

The blushing behaviour was assessed by means of the domed method. In the dome method the blushing was determined by means of a falling dart apparatus, using a falling dart having a mass of 500 gram, a punch diameter of 50 mm and a dome radius of 25 mm and a steel tube of 53 mm diameter. The drop height was 30, 50, 100, 160 and 200 cm. As test specimen was used an injection moulded plaque having an edge length of 65*65 mm and a thickness of 1.6 mm. Testing was carried out at 23° C. after storing the test specimens for 14 days after injection moulding under standard conditions of 23° C./50% atmospheric humidity. Each test specimen is being subjected to only one impact test. The test specimen was first laid on a flat surface without being clamped and the falling dart was subsequently released. To obtain the test value, at least two test specimens for each drop height were tested. The judgment of the visible blushing region follows after 7 days storing at 23° C. and 50% RH and is reported in categories from 0 (no blushing) till 10 (bad blushing behaviour).

Flexural-Modulus

The flexural-modulus was measured in accordance with ASTM D790. The test specimen was injection moulded and prepared to a length of 63.5 mm, a width of 12.7 mm and a thickness of 3.2 mm. The flexural-modulus was determined by measuring in the flow direction and perpendicular on the flow direction. To allow after-crystallization to occur, the test specimen was stored for 14 days under standard conditions of 23° C./50 atmospheric humidity. A test unit model Z010 from Zwick-Roell was used for testing. The testing velocity in the determination of the flexural modulus was 13.5 mm/min. The yield point in the determination of the modulus was in the range 0.05%-0.25%.

Notched Izod

The notched Izod was measured in accordance with ISO 180/4A. The test specimen was injection moulded and prepared to a length of 63.5 mm, a width of 12.7 mm and a thickness of 3.2 mm. The notched Izod was determined by measuring in the flow direction and perpendicular on the flow direction. To allow after-crystallization to occur, the test specimen was stored for 14 days under standard conditions of 23° C./50 atmospheric humidity.

$^{13}$C-NMR

The overall $C_2$-content and the $C_2$-content in the propylene-ethylene copolymers ($RCC_2$) were determined by means of $^{13}$C-NMR spectroscopy.

DSC

The determination of the melting point was carried out by means of DSC (differential scanning calorimetric). The measurement was carried out in accordance to DIN 51007/53765 or ASTM D3417-97/D3418-97, using a first heating step at a heating rate of 10 per minute up to 180° C., a dynamic crystallization at a cooling rate of 10° C. per minute down to 25° C. and a second heating step at a heating rate of 10° C. per minute back up to 180° C. The melting point is then the temperature at which the enthalpy versus temperature curve measured during the second heating step displays a maximum.

MFR

MFR measurements are carried out in accordance with ISO1133 using a 2.16 kg weight and a temperature of 230° C.

The results and conditions of the examples are given in Tables 1 and 2.

| Examples | R1 MFR ISO1133 (dg/min) | R2 MFR ISO1133 (dg/min) | $^{13}$C-NMR ($RCC_2$) | $^{13}$C-NMR RC | MFRR |
|---|---|---|---|---|---|
| 1 | 13.7 | 11.7 | 16.2 | 21 | 2 |
| 2 | 6.3 | 5.4 | 16.8 | 28 | 2 |
| 3 | 6.3 | 5.9 | 20.9 | 29 | 1 |
| IV | 6.1 | 5.2 | 55.5 | 22 | 1 |

Reaction conditions:
Polymerization
Al/Mg       4
Al/Si       6
Reactor1 (R1)
p (baro)    21
τ (min)     ≧60
T (° C.)    71
n (rpm)     65
V (l)       3.8
Reactor2 (R2)
p (baro)    21
τ (min)     ≧60
T (° C.)    66
n (rpm)     75
V (l)       3.8

TABLE 2

| | Example 1 | Example 1A* | Example 2 | Example 2A | Example 2B* | Example 3 | Comp. Exp. IV | Comp. Exp. IVA |
|---|---|---|---|---|---|---|---|---|
| MFR | 14 | 45 | 5.9 | 5.8 | 38 | 6.8 | 5.2 | 26 |
| DSC Melting point (° C.) | 166.1 | | 165.8 | | | | | |
| Flexural Modulus parallel (Mpa) | 1113 | 1095 | 1123 | 1201 | 1176 | 965 | 1441 | 1354 |
| Flexural Modulus perpendicular (Mpa) | 1096 | 1092 | 1103 | 1164 | 1136 | 926 | 1288 | 1267 |
| Izod notched Impact 23° C. parallel (KJ/m2) | 8.5 | 6.4 | 33 | 26 | 4.2 | 50 | 23 | 5 |
| Izod notched Impact 23° C. perpendicular (KJ/m2) | 7.8 | 6 | 26 | 6.4 | 4 | 42 | 27 | 5.1 |
| Izod notched Impact 0° C. perpendicular (KJ/m2) | 3 | 3 | 3.3 | 2.3 | 2.3 | 4.5 | 6.7 | 4.5 |
| Izod notched Impact −20° C. perpendicular (KJ/m2) | 1.8 | 1.7 | 1.7 | 1.5 | 1.6 | 1.6 | 4.9 | 3.7 |
| Haze (%) | 30 | 34 | 28 | 59 | 73 | 61 | n.m. | n.m. |
| Transmission (%) | 82 | 81 | 80 | 83 | 83 | 79 | 62 | 61 |
| Transparency (%) | 52 | 47 | 52 | 24 | 10 | 18 | n.m. | n.m. |
| Stress whitening | 0 | 0 | 0 | 0 | 1.4 | 0 | 8.3 | >10 |
| millad3988 | 0.2 | 0.2 | 0.2 | | | | | |
| ADK STAB NA-11 | | | | 0.05 | 0.05 | 0.05 | 0.05 | 0.05 |

*rheology controlled
n.m. = not measurable

The invention claimed is:

1. A propylene copolymer composition consisting of a propylene homopolymer (A) as a matrix polymer, a propylene copolymer (B) containing 13-25 wt. % calculated with respect to the amount of B of ethylene and optionally, one or more additives, wherein the propylene homopolymer (A) and the propylene copolymer (B) are prepared using a Ziegler-Natta catalyst system, the molecular weight distribution $M_w/M_n$ of each of propylene homopolymer (A) and propylene copolymer (B) is larger than 3 and the propylene copolymer composition has a transparency higher than 8,
    wherein the ratio of the melt flow rate of propylene homopolymer (A) to the melt flow rate of propylene copolymer (B) ($MFR_A/MFR_B$) is lower than 50,
    wherein said propylene copolymer composition has a Melt Flow Rate (MFR) higher than 4 and
    wherein the Melt Flow Rate (MFR) is measured in accordance with ISO 1133 using a 2.16 kg weight and at a temperature of 230° C.

2. The propylene copolymer composition according to claim 1 wherein the amount of copolymer B calculated with respect of the total amount of A+B is between 10 and 50 wt. %.

3. The propylene copolymer composition according to claim 1, wherein the ratio $MFR_A/MFR_B$ is lower than 20.

4. The propylene copolymer composition according to claim 1, wherein the ratio $MFR_A/MFR_B$ is lower than 10.

5. The propylene copolymer composition according to claim 1, wherein the additive is a nucleating agent.

6. The propylene copolymer composition according to claim 1 which has been compression molded, blow molded, injection molded or extruded as moldings, films, sheets or pipes.

7. The propylene copolymer composition according to claim 1 wherein said propylene copolymer composition has a Flexural Modulus, measured in accordance with ASTM D790 using a test specimen that was injection moulded and prepared to a length of 63.5 mm, a width of 12.7 mm and a thickness of 3.2 mm, higher than 600 MPa and an Izod notched impact (0° C., perpendicular), measured in accordance with ISO 180/4A higher than 2.0 KJ/m².

8. The propylene copolymer composition according to claim 1 optionally containing an additive selected from the group consisting of nucleating agents and clarifiers, stabilizers, release agents, fillers, peroxides, plasticizers, anti-oxidants, lubricants, antistatics, cross linking agents, scratch resistance agents, high performance fillers, pigments and/or colorants, impact modifiers, flame retardants, blowing agents, acid scavengers, recycling additives, coupling agents, anti microbials, anti fogging additives, slip additives, anti blocking additives and polymer processing aids.

9. An article comprising a propylene copolymer composition consisting of a propylene homopolymer (A) as a matrix polymer, a propylene copolymer (B) containing 10-35 wt. % calculated with respect to the amount of B of an olefin other than propylene and, optionally one or more additives selected from the group consisting of nucleating agents and clarifiers, stabilizers, release agents, fillers, peroxides, plasticizers, anti-oxidants, lubricants, antistatics, cross linking agents, scratch resistance agents, high performance fillers, pigments and/or colorants, impact modifiers, flame retardants, blowing agents, acid scavengers, recycling additives, coupling agents, anti microbials, anti fogging additives, slip additives, anti blocking additives and polymer processing aids, wherein the propylene homopolymer (A) and the propylene copolymer (B) are prepared using a Ziegler-Natta catalyst system, the molecular weight distribution Mw/Mn of each of propylene homopolymer (A) and propylene copolymer (B) is larger than 3 and the propylene copolymer composition has a transparency higher than 8 wherein said article is chosen from the group consisting of a molding, a film, a sheet and a pipe.

* * * * *